Oct. 24, 1944. M. P. GRAHAM 2,361,024
SPRING SEAT
Filed March 10, 1943
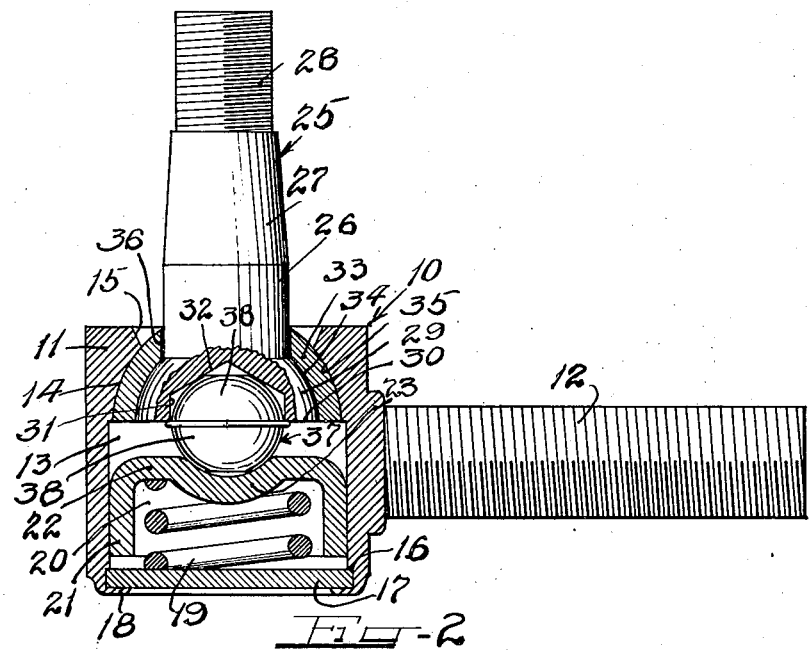
Inventor
Matthew P. Graham
by Charles Hill
Attys.

Patented Oct. 24, 1944

2,361,024

UNITED STATES PATENT OFFICE 2,361,024

SPRING SEAT

Matthew P. Graham, Detroit, Mich., assignor to Thompson Products Incorporated, Cleveland, Ohio, a corporation of Ohio Application March 10, 1943, Serial No. 478,619

9 Claims. (Cl. 287—90)

This invention relates to a device adapted to provide a rounded projection on a recessed member.

Specifically, the invention relates to a seat adapted to center a spring load on a stud and permit tilting and rotation of the stud.

The invention will hereinafter be specifically described as embodied in a spring seat for tie rod joints, but it should be understood that the invention is not limited to such an embodiment inasmuch as it is generally applicable to provide a projection on a recessed member.

In accordance with this invention a headed stud having a flat end with a central axial well, receives in the well the pilot portion of a seat member having an outturned bead engaging the flat end of the stud around the well. The seat member has a fragmental spherical dome preferably with a radius centered on a plane including the face of the bead which engages the end of the stud. The dome of the seat member is adapted to ride in a dimple or depression of a spring-urged cup. The seat member of this invention is effective to transfer the spring load from the cup to the stud and at the same time permit universal movement of the stud relative to the cup.

In order that the seat devices of this invention can be used in two positions, the pilot portion is preferably formed to the same spherical shape as the dome portion. The preferred device therefore is a one-piece member composed of a pair of less than hemispheres with an outturned bead therebetween and with each hemisphere having a radius centered on a plane passed through the opposite face of the bead. Alternately, however, the pilot portion could be in the form of a cylindrical lug or one or both spherical portions could have the radius thereof centered on the adjacent face of the bead or intermediate this adjacent face and the opposite face.

It is, then, an object of this invention to provide a device adapted for forming a rounded projection on a recessed wall of a member.

A further object of this invention is to provide a device having a pilot portion for fitting into the recess of a recessed member, a shoulder for bottoming on the member, and a spherical dome having a radius centered on the member-engaging plane of the shoulder at the axial center of the pilot portion.

A still further object of this invention is to provide a generally ball-shaped device with an annular bead around the great circle thereof.

A still further object of this invention is to provide a spring seat useful in tie rod joints to center the spring load on the stud of the joint while permitting universal movement of the stud.

A still further object of the invention is to provide a spring seat in the form of a generally ball-shaped member with an annular bead therearound having opposed abutment shoulders.

Other and further objects of the invention will be apparent to those skilled in the art from the following detailed description of the annexed sheet of drawings which, by way of preferred example only, illustrates one embodiment of the invention.

On the drawing:

Figure 1 is a side elevational view, with parts broken away and shown in vertical cross section, of a tie rod joint having a spring seat according to this invention.

Figure 2 is an enlarged plan view of the spring seat of this invention.

Figure 3 is a side elevational view of the spring seat of this invention.

As shown on the drawing:

In Figure 1 the reference numeral 10 designates generally a tie rod end or joint having a socket 11 with a laterally projecting externally threaded stem or shank 12 adapted for insertion in a tie rod. The socket 11 has a cylindrical bore 13 extending from the bottom thereof and terminating in a fragmental spherical bearing wall 14. The bearing wall 14 converges inwardly to a reduced circular opening 15 in the top of the socket.

The socket 11 has an internal shoulder 16 in the bottom end thereof receiving a closure disk or plate 17 thereagainst. The end of the socket is spun over this disk as at 18 to close the bottom end of the socket.

A spring 19 is bottomed on the disk 17 and a cup member 20 encases the spring 19 and has a cylindrical skirt portion 21 slidably engaging the wall of the cylindrical bore 13. The cup member 20 has a top wall 22 with a rounded depression or dimple 23 in the center thereof.

A stud, designated generally by the reference numeral 25, has a cylindrical shank portion 26 projecting freely through the circular opening 15 and merging into a conical portion 27. The small end of the conical portion 27 merges into an externally threaded cylindrical portion 28. A steering arm (not shown) is adapted to be seated on the conical portion 27 and held thereon by means of a nut (not shown) threaded onto the end 28.

The stud 25 has a fragmental spherical head 29 in the socket 11. This head 29 has a flat end 30 with a central cylindrical well or recess 31 projecting inwardly therefrom. The well or recess can be provided with a conical-shaped bottom 32 formed by the pointed end of the drill which cuts the recess into the stud.

A hollow sleeve or bushing 33 has an internal segmental spherical bearing wall 34 seated on the head 29 of the stud and an external segmental spherical bearing wall 35 seated on the bearing wall 14 of the socket.

A cylindrical wall 36 of the member 33 surrounds the cylindrical portion 26 of the stud.

The stud is rotatable in the member 33 but will carry the member therewith during tilting movements so that this member will tilt on the bearing wall 14 of the socket.

In accordance with this invention a spring seat 37 is provided between the stud 25 and the cup 20 to center the load of the spring 19 on the stud.

The device 37, as best shown in Figures 2 and 3, is a one-piece generally ball-shaped member with opposed spherical portions 38 which are less than hemispheres. These portions 38 have an annular bead 39 therebetween. The bead 39 has opposed flat shoulders 40 on opposite sides thereof.

The spherical portions 38 can have flat ends 41 as shown, or the spherical continuity can be continued to provide rounded axial ends.

The spherical portion 38 adjacent a shoulder 40 has a radius R, as shown in Figure 3, centered on a plane containing the opposite shoulder 40 of the bead. Thus each portion 38 is actually less than a hemisphere since the center of the sphere is in spaced relation from the base of the sphere segment.

When the device 37 is assembled in the joint of Figure 1, one dome portion or spherical segment 38 thereof serves as a pilot portion and is seated in the well 31 of the stud. The shoulder 40 of the bead adjacent this pilot serving portion of the sphere segment is bottomed on the flat end wall 30 of the stud. The other spherical portion 38 of the device thus forms a true spherical projection on the stud with a radius centered on the end wall 30 of the stud. Since it is desired to have the well 31 centered on the axial center of the stud 25, and since the bearing surfaces of the assembly are preferably sphere segments struck from radii centered on the end wall 30 at the axial center of the stud, the radius for the projecting spherical portion 38 of the device 37 will also be at the axial center of the stud and coinciding with the centers of the stud head 29, the inner face 34 of the bushing 33, the outer face 35 of this bushing, and the bearing wall 14 of the housing. Thus when the stud is moved in the housing, the device 37 moves therewith about the same center as all bearing surfaces of the assembly.

The projecting portion 38 of the device 37 rides in the dimple or depression 23 of the cup member. If the stud is tilted in the socket, the device 37 will move with the stud and it can freely ride in the cup member 20 without depressing the cup. The load of the spring 19 on the stud will always be uniform since the projecting portion 38 of the device 37 is a true sphere portion centered at the same point as all bearing surfaces of the assembly.

If fluctuations in spring load are not critical the center point for the projecting sphere portion 38 need not be the same as the center point of the bearing surfaces of the assembly and the radius for this portion 38 could be struck, for example, from planes including the adjacent bead shoulder 40 up to and including the opposite bead shoulder 40. Such variations are especially useful when the centers of the bearing surfaces of the assembly are on such planes instead of on the end face 30.

The portions 38 of the device 37 are identical and the device can be used in reversed position.

From the above descriptions it will be understood that the invention provides a generally ball-shaped member adapted for forming a rounded projection on the recessed end of a stud to center a spring load on the stud.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A seat comprising a generally ball-shaped member having an annular bead therearound with opposed abutment shoulders, the portions of said member extending from each shoulder being fragmental spheres with radii centered from points lying in the planes of the opposed shoulders.

2. A spring seat comprising integral opposed fragmental spheres with an outturned bead therebetween, the sphere fragment adjacent each side of the bead having a radius centered on the opposite side of the bead.

3. A joint member including a socket having an internal bearing wall accommodating tilting movements and a stud having a head portion tiltable on said bearing wall of the socket, the improvements of said head portion of the stud having an end wall with a recess therein, a separate member having a pilot portion seated in said recess and a shoulder bottomed on said end wall, said member having a rounded dome depending from said end wall, and a spring-urged cup in said socket having a rounded depression receiving said rounded dome of said member.

4. In a joint assembly including a socket, a stud tiltable and rotatable in said socket, and a spring-urged cup member in said socket, the improvement of a separate seat member having a pilot portion extending into said stud, a shoulder bottomed on the end of the stud, and a rounded projection riding on said spring-urged member.

5. A tie rod end comprising a socket, a cup having an end wall with a rounded recess therein, a spring in said cup, a stud tiltable and rotatable in said socket, said stud having an end wall with a central recess, a separate member having a pilot portion seated in said recess, a shoulder bottomed on said end wall, and a rounded dome riding in said recessed portion of the cup to center the spring load on the stud.

6. In a tie rod joint having a socket, a stud tiltable and rotatable in said socket, and a spring-urged cup slidable in said socket, the improvement of a separate spring seat member between said stud and said cup, said member having a rounded dome riding on said cup, a shoulder bottomed on said stud and a pilot portion projecting into said stud.

7. In a joint assembly including a socket having an internal fragmental spherical bearing wall, a stud with a fragmental spherical bearing wall seated on said socket bearing wall, said stud having an end wall with a well therein, and a spring loaded member in said socket having a rounded depression, the improvement of a separate seat device transferring spring load from the member to the stud, said device having a pilot portion seated in said well, a shoulder portion bottomed on said end wall and a projecting spherical portion riding in said depression, and said spherical portion having a radius centered on the same point as the radii for said bearing walls whereby the bearing walls can move on each other without changing the spring load.

8. The combination with a member having a recessed end wall, of a device for forming a rounded projection on said recessed end wall of the member, said device having a pilot portion for fitting into the recess of the member, a shoulder for bottoming on the end wall of the member, and a fragmental spherical dome with a radius centered on the wall-engaging plane of said shoulder at the axial center of the pilot portion.

9. The combination with a stud having a recessed end, of a member having a pilot portion seated in said recess, an outturned shoulder portion engaging said stud around the recess, and a rounded dome depending from said shoulder portion to form a rounded projection on the recessed end of the stud.

MATTHEW P. GRAHAM.